UNITED STATES PATENT OFFICE.

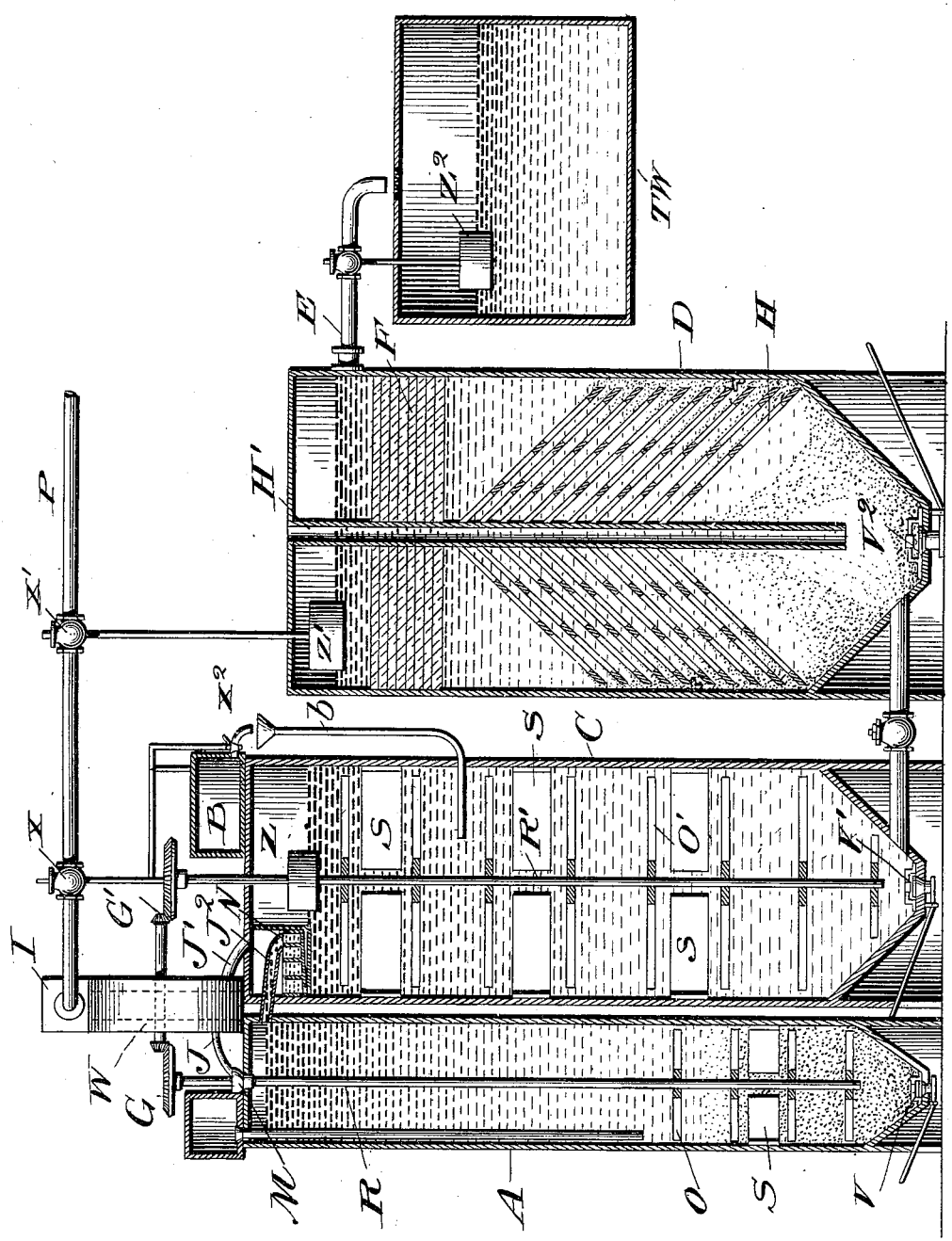

CHARLES HERSCHEL KOYL, OF NEW YORK, N. Y.

APPARATUS FOR PURIFYING WATER.

SPECIFICATION forming part of Letters Patent No. 653,011, dated July 3, 1900.

Original application filed December 20, 1899, Serial No. 740,958. Divided and this application filed February 9, 1900. Serial No. 4,620. (No model.)

*To all whom it may concern:*

Be it known that I, CHARLES HERSCHEL KOYL, of the city, county, and State of New York, have invented a certain new and useful Improvement in Apparatus for Softening and Purifying Water, of which the following is a specification.

This application is a division of my application for Letters Patent filed December 20, 1899, Serial No. 740,958, for certain improvements in apparatus for softening and purifying water, and the specific subject-matter to which it is directed is the manner of combining and connecting the reaction-tank, in which the chemical reagents are mixed with and act upon the raw water, with the settling and filtering tank, within which the water is freed from its suspended matter.

The invention will first be described in connection with the accompanying drawing and will then be more particularly pointed out in the claim.

The drawing represents the complete apparatus in vertical central section.

A is a tank for the solution and supply of lime (CaO) or other slightly-soluble chemical.

B is a tank for the solution and supply of sal soda ($Na_2CO_3$) or other easily-soluble chemical.

C is a reaction-tank to which are fed the raw water and the lime and soda or other reagents in definite amounts and within which these reagents are mixed with and act upon the water, producing precipitates of the material which it is desired to take out of the water.

D is a settling and filtering tank in which the water rises slowly to the top, leaving its precipitates, and from the top of which tank the water issues through the pipe E soft and clean and ready for use.

Each of the three tanks A, C, and D is provided at the bottom with a sediment-chamber formed by giving the lower end of the tank a conical or tapering shape, the bottom of each chamber being closed by a dumping-valve V, V', or V", which by a suitable lever can be opened whenever desired to dump or discharge the accumulated sediment in the tank. The raw water through the pipe P discharges into a box I, fitted near its bottom with two outlet pipes or exits J J', (which of course will be provided with sluice-gates or cocks to regulate the discharge.) The one pipe J discharges a part of the raw water into a bowl M, surrounding the central pipe R in tank A, which pipe is mounted so as to revolve and has attached to it radial stirrers O. Within the bowl M there are perforations in the central pipe R, through which the water from pipe J will pass into the pipe R and passing down the latter will be discharged from its lower end into the tank A. The remainder of the raw water discharges from the pipe J' into the pan N, into which also discharges through a chute J" the chemical from tank A. From the pan (which is provided with a series of baffle-plates to insure the more thorough intermingling of the chemical with the raw water) the water passes into the reaction-tank C. The chemical from box B discharges through an exit-nozzle controlled by a valve or cock X" into pipe *b*, which, for a purpose hereinafter indicated, leads into the reaction-tank B at a point some distance below where the water mixed with the chemical from tank A enters. The flowing water in pipe P is controlled by the valves X X', which are controlled by floats Z Z' in the tanks C D, respectively, through the operation of intermediate connections. The same means are employed to control the cock X" of the box B, said cock being connected to the float Z, as shown. Mechanism of this kind is well known and requires no detailed description or illustration. The said pipe E is provided with a valve which is similarly controlled by a float Z", located in the tank T W, which contains the treated or purified water. The reaction-tank C is provided with a central shaft R', which, like the hollow shaft R in tank A, is provided with radial stirrers O'. Within the inlet-box I is mounted a water-wheel W, which is driven by the entering water, and the shafts R R' are driven from the water-wheel by gearing typically represented at G G'. Each tank A and C contains baffle-plates S to prevent undue movement of the liquid.

Within the settling-tank is placed a series of superposed radially slitted or perforated hollow settling-cones H, placed small end uppermost, surrounding at the center a pipe H', open at both ends and resting at their bases on brackets provided for that purpose upon the inner wall of the settling-tank, these cones nesting together, but being placed at a certain interval apart from one another. Above them is the filter-bed F. There is an annular space between the outer rims of the settling-cones and the inner wall of the tank D, down through which the sediment can pass to the bottom of the tank.

The apparatus just described is designed for the continuous purification of water. When it is in operation, the action of the chemicals on the raw water in the reaction-tank results in the production of fine precipitates, which are largely carried over with the water into the settling-tank. I have discovered that these fine precipitates formed by the chemical action referred to are much aided in their settling by passing through a body of water containing a large amount of sediment, the sediment acting much as a strainer to retain and hold the precipitates. To this end the connecting-pipe P', through which the water with the fine precipitates which it carries flows from the reaction-tank into the settling-tank, enters said settling-tank at a point as low and as near the bottom of the latter as possible. In this way the inflowing water from the reaction-tank is forced to pass upward through the mass of sediment at the bottom of the tank D and in so doing is relieved from much of the fine precipitates, and the settling operation is thereby greatly facilitated.

What I here claim as new, and desire to secure by Letters Patent, is—

In an apparatus for the continuous purification of water, a reaction-tank, in which the water is chemically treated and the precipitates resulting from that treatment are produced, a settling-tank and a connecting pipe or duct between the two tanks which opens into the settling-tank at the bottom thereof whereby the treated water with the suspended material from the reaction-tank is compelled to enter the settling-tank below the mass of sediment in said tank and to rise up therethrough in its passage through said tank substantially as and for the purposes hereinbefore set forth.

In testimony whereof I have hereunto set my hand this 3d day of February, 1900.

CHARLES HERSCHEL KOYL.

Witnesses:
OWEN E. ABRAHAM,
PHILIP EARL DUDLEY.